United States Patent
Li et al.

(10) Patent No.: US 10,834,786 B2
(45) Date of Patent: Nov. 10, 2020

(54) HEATING TAPE AND SYSTEM

(71) Applicant: 3M INNOVATIVE PROPERTIES COMPANY, St. Paul, MN (US)

(72) Inventors: Jian Li, Ontario (CA); Paolo Rocca, Ontario (CA); Jonathan M. Cliffen, Ontario (CA); Ranjith Divigalpitiya, Ontario (CA); Frank A. Brandys, Ontario (CA); Anibal S. Sanchez-Garcia, Ontario (CA); Weixing Hou, Ontario (CA); David E. Livingstone, Ontario (CA); Raul P. Moraes, Ontario (CA)

(73) Assignee: 3M Innovative Properties Company, St. Paul, MN (US)

( * ) Notice: Subject to any disclaimer, the term of this patent is extended or adjusted under 35 U.S.C. 154(b) by 144 days.

(21) Appl. No.: 16/069,406

(22) PCT Filed: Jan. 11, 2017

(86) PCT No.: PCT/US2017/012998
§ 371 (c)(1),
(2) Date: Jul. 11, 2018

(87) PCT Pub. No.: WO2017/123620
PCT Pub. Date: Jul. 20, 2017

(65) Prior Publication Data
US 2019/0008000 A1 Jan. 3, 2019

Related U.S. Application Data

(60) Provisional application No. 62/277,606, filed on Jan. 12, 2016.

(51) Int. Cl.
*H05B 1/02* (2006.01)
*H05B 3/00* (2006.01)
(Continued)

(52) U.S. Cl.
CPC ............ *H05B 3/565* (2013.01); *B32B 5/022* (2013.01); *B32B 5/024* (2013.01); *B32B 7/06* (2013.01);
(Continued)

(58) Field of Classification Search
CPC ...... H05B 3/565; H05B 1/0288; H05B 3/145; H05B 3/146; H05B 2203/019;
(Continued)

(56) References Cited

U.S. PATENT DOCUMENTS

| 3,344,385 A | 9/1967 | Bartos |
| 3,793,716 A | 2/1974 | Smith-Johannsen |

(Continued)

FOREIGN PATENT DOCUMENTS

| CN | 102307403 | 1/2012 |
| CN | 102427616 | 4/2012 |

(Continued)

OTHER PUBLICATIONS

Supplemental EP Search Report for EP Appl. No. 17738850.1, dated Jul. 17, 2019, 2 pp.

(Continued)

*Primary Examiner* — Mark H Paschall
(74) *Attorney, Agent, or Firm* — Gregg H. Rosenblatt (57) ABSTRACT

A heating tape comprises an insulated heating element that includes a heating element layer comprising a polymer composite having conductive particles and at least one set of conductive electrodes at least partially embedded in the polymer composite and extending along at least a substantial portion of the length of the heating tape. A heating tape system for a pipe or other surface, further includes a power ramp controller having a solid state relay component to (Continued)

regulate an in-rush of current to the heating element. The heating tape system also includes a connector having multiple contact points.

18 Claims, 5 Drawing Sheets

(51) Int. Cl.
| | |
|---|---|
| H05B 3/56 | (2006.01) |
| B32B 15/095 | (2006.01) |
| B32B 15/20 | (2006.01) |
| B32B 27/08 | (2006.01) |
| B32B 27/20 | (2006.01) |
| B32B 27/32 | (2006.01) |
| B32B 27/36 | (2006.01) |
| B32B 27/40 | (2006.01) |
| C09D 175/04 | (2006.01) |
| B32B 15/08 | (2006.01) |
| C09J 7/29 | (2018.01) |
| B32B 27/28 | (2006.01) |
| B32B 15/085 | (2006.01) |
| B32B 27/12 | (2006.01) |
| B32B 27/34 | (2006.01) |
| B32B 15/06 | (2006.01) |
| B32B 15/09 | (2006.01) |
| B32B 5/02 | (2006.01) |
| B32B 25/10 | (2006.01) |
| B32B 27/30 | (2006.01) |
| B32B 25/04 | (2006.01) |
| B32B 25/08 | (2006.01) |
| B32B 15/02 | (2006.01) |
| B32B 27/06 | (2006.01) |
| B32B 15/082 | (2006.01) |
| B32B 7/12 | (2006.01) |
| B32B 7/06 | (2019.01) |
| C09J 7/24 | (2018.01) |
| C09J 7/38 | (2018.01) |
| C09J 9/02 | (2006.01) |
| H05B 3/14 | (2006.01) |
| C08K 3/04 | (2006.01) |

(52) U.S. Cl.
CPC .............. *B32B 7/12* (2013.01); *B32B 15/02* (2013.01); *B32B 15/06* (2013.01); *B32B 15/08* (2013.01); *B32B 15/082* (2013.01); *B32B 15/085* (2013.01); *B32B 15/09* (2013.01); *B32B 15/095* (2013.01); *B32B 15/20* (2013.01); *B32B 25/04* (2013.01); *B32B 25/08* (2013.01); *B32B 25/10* (2013.01); *B32B 27/06* (2013.01); *B32B 27/08* (2013.01); *B32B 27/12* (2013.01); *B32B 27/20* (2013.01); *B32B 27/281* (2013.01); *B32B 27/285* (2013.01); *B32B 27/286* (2013.01); *B32B 27/288* (2013.01); *B32B 27/302* (2013.01); *B32B 27/304* (2013.01); *B32B 27/308* (2013.01); *B32B 27/32* (2013.01); *B32B 27/322* (2013.01); *B32B 27/34* (2013.01); *B32B 27/36* (2013.01); *B32B 27/365* (2013.01); *B32B 27/40* (2013.01); *C09D 175/04* (2013.01); *C09J 7/241* (2018.01); *C09J 7/29* (2018.01); *C09J 7/38* (2018.01); *C09J 9/02* (2013.01); *H05B 1/0288* (2013.01); *H05B 3/145* (2013.01); *H05B 3/146* (2013.01); *B32B 2250/05* (2013.01); *B32B 2255/02* (2013.01); *B32B 2255/26* (2013.01); *B32B 2262/103* (2013.01); *B32B 2262/106* (2013.01); *B32B 2264/105* (2013.01); *B32B 2264/108* (2013.01); *B32B 2270/00* (2013.01); *B32B 2307/20* (2013.01); *B32B 2307/202* (2013.01); *B32B 2307/206* (2013.01); *B32B 2307/3065* (2013.01); *B32B 2307/412* (2013.01); *B32B 2307/546* (2013.01); *B32B 2307/58* (2013.01); *B32B 2307/702* (2013.01); *B32B 2307/7246* (2013.01); *B32B 2307/732* (2013.01); *B32B 2307/748* (2013.01); *B32B 2405/00* (2013.01); *B32B 2419/00* (2013.01); *B32B 2437/00* (2013.01); *B32B 2439/00* (2013.01); *B32B 2457/00* (2013.01); *B32B 2457/10* (2013.01); *B32B 2597/00* (2013.01); *B32B 2605/00* (2013.01); *B32B 2605/08* (2013.01); *C08K 3/04* (2013.01); *C09J 2201/122* (2013.01); *C09J 2201/606* (2013.01); *C09J 2203/326* (2013.01); *C09J 2205/106* (2013.01); *C09J 2400/10* (2013.01); *C09J 2400/163* (2013.01); *C09J 2423/046* (2013.01); *C09J 2433/00* (2013.01); *C09J 2433/006* (2013.01); *C09J 2475/006* (2013.01)

(58) Field of Classification Search
CPC .......... H05B 2203/02; H05B 3/34; C09J 7/38; C09J 2201/606; C08K 3/04; B23B 5/022; B23B 5/024; B23B 7/07; B23B 7/12
USPC ........ 219/494, 528, 549, 535, 212, 504, 505
See application file for complete search history.

(56) References Cited

U.S. PATENT DOCUMENTS

| | | | |
|---|---|---|---|
| 3,823,217 A | 7/1974 | Kampe | |
| 3,858,144 A | 12/1974 | Bedard | |
| 3,900,654 A | 8/1975 | Stinger | |
| 3,904,850 A * | 9/1975 | Johnson | F24H 9/18 219/528 |
| 3,914,363 A | 10/1975 | Bedard | |
| 4,058,704 A | 11/1977 | Shimizu | |
| 4,314,231 A | 2/1982 | Walty | |
| 4,318,881 A | 3/1982 | Sopory | |
| 4,426,633 A | 1/1984 | Taylor | |
| 4,560,524 A | 12/1985 | Smuckler | |
| 4,575,617 A * | 3/1986 | Cooper | G05D 23/1906 219/494 |
| 4,689,475 A | 8/1987 | Kleiner | |
| 4,849,255 A | 7/1989 | Grise | |
| 4,922,083 A * | 5/1990 | Springs | H05B 3/146 219/549 |
| 5,111,025 A | 5/1992 | Barma | |
| 5,143,649 A | 9/1992 | Blackledge | |
| 5,663,215 A * | 9/1997 | Milligan | C09D 5/1675 427/386 |
| 5,841,111 A | 11/1998 | Shea | |
| 6,288,372 B1 | 9/2001 | Sandberg | |
| 6,492,595 B2 | 12/2002 | Sexton | |
| 6,511,701 B1 | 1/2003 | Divigalpitiya | |
| 6,519,835 B1 * | 2/2003 | Von Arx | A47J 36/2483 29/611 |
| 6,624,383 B1 | 9/2003 | Lichtenstein | |
| 7,644,495 B2 | 1/2010 | Aisenbrey | |
| 10,470,251 B2 * | 11/2019 | Kazemi | H05B 3/146 |
| 2002/0040898 A1 * | 4/2002 | Von Arx | A47J 36/2483 219/535 |
| 2006/0191903 A1 * | 8/2006 | Naylor | E01C 11/265 219/528 |
| 2006/0289468 A1 * | 12/2006 | Seibert | E01C 11/265 219/528 |
| 2009/0212040 A1 | 8/2009 | O'Connor | |
| 2009/0242548 A1 | 10/2009 | Iida | |

(56) References Cited

U.S. PATENT DOCUMENTS

2013/0277359 A1  10/2013  Fukuda
2014/0103938 A1   4/2014  Jones
2014/0166638 A1   6/2014  Irgens

FOREIGN PATENT DOCUMENTS

EP    0 175 550 A1   3/1986
EP    0235454        9/1987
EP    1172831        1/2002
WO    2014-099566    6/2014

OTHER PUBLICATIONS

International Search Report for PCT International Application No. PCT/US2017/012998, dated Apr. 21, 2017, 3 pages.

\* cited by examiner

HEATING TAPE AND SYSTEM

BACKGROUND

Self-regulating heat tracing cables are known and have been applied in pipe freeze protection applications. However the current cable products suffer from lack of flexibility and narrow heating profile, which complicates installation and reduces heating efficiency.

Polymer based heating devices are also used in industrial, commercial and residential applications. Electrode/organic semi-conductive material interfaces are common for this type of heater. The semi-conductive composite materials are usually made of elastomers, thermoplastic or thermoset polymers blended with conductive fillers including carbon black, carbon fillers, graphites, metal particles, etc. The conductive composite is in contact with metal electrodes that can be connected to a power source.

Due to relatively low conductive fill concentration at the interface and a limited electrode/polymer contact, the electrical contact resistance is very high. This creates a problem in that the high contact resistance may cause an excessive heat generation at the interface and accelerate material degradation at the interface, which compromises the heater's long-term reliability and limits its use in high voltage and current applications.

Various methods have been exploited with an attempt to solving this high contact resistance problem. For example, see U.S. Pat. Nos. 3,858,144, 4,849,255, 4,314,231, and 4,689,475. However, these methods can be complicated, costly, less effective or otherwise not applicable to making heating devices.

Thus, there is a need for a simple, efficient and low cost heating tape that is thinner and wider than traditional heating cables for the heat tracing and surface heating applications. In addition, there is also a need for an efficient and reliable electrical connection to the heating tape.

SUMMARY OF THE INVENTION

In one aspect of the invention, a heating tape comprises an insulated heating element that includes a heating element layer comprising a polymer composite having conductive particles and at least one set of conductive electrodes at least partially embedded in the polymer composite and extending along at least a substantial portion of the length of the heating tape. In another aspect, the heating tape further comprises first and second grounding sheaths, wherein the insulated heating element is disposed between the first and second grounding sheaths. The heating tape can also further comprise first and second barrier layers to protect the heating tape from moisture ingress. In another aspect, the insulated heating element comprises first and second insulating layers disposed on either side of the heating element layer. In yet another aspect, the insulated heating element comprises cured liquid resin covering the sides of the heating element layer.

In another aspect, the heating tape further comprises an adhesive layer disposed on one of the first and second barrier films. In one aspect, the adhesive comprises a pressure sensitive adhesive.

In another aspect, the polymer composite has conductive particles and comprises a carbon black polymer composite. In another aspect, the carbon black polymer composite comprises a polyolefin blended with carbon black. In yet a further aspect, the carbon black polymer composite comprises a low density polyethylene blended with carbon black.

In another aspect, the polymer composite comprises an amorphous polymer.

In another aspect, the at least one set of electrodes comprise a graphene-like coating on at least one major surface. In a further aspect, the graphene-like coating comprises graphite nano-platelets in amorphous carbon or graphite.

In another aspect, the heating film comprises an extruded material.

In another aspect, the first and second insulating films each comprise a thermoplastic polyurethane film.

In another aspect, the first and second grounding sheaths each comprise a flexible metal material. In a further aspect, the grounding sheath metal material comprises one of a metal foil and a metal screen.

In another aspect, the first and second barrier films each comprise a moisture resistant, flame retardant material.

In another aspect, the heating tape further comprises a weak adhesive disposed between the first insulating film and the first grounding sheath at a separation point in the tape.

In another aspect, the heating tape has a width of at least 50 mm.

In another aspect, the heating tape extends along a length of and is adhered around a substantial portion of the circumference of a pipe.

In another aspect, the polymer composite further includes an adhesion promoter to enhance the adhesion between the polymer composite and the set of electrodes.

In yet another aspect of the invention, a self regulating heat tape system for a pipe or other surface comprises the heating tape described herein and a power ramp controller having a solid state relay component to regulate an in-rush of current to the heating element. In another aspect, the self regulating heat tape system further comprises one or more connectors having multiple contact points to contact the at least one set of electrodes of the heating element layer. In a further aspect, the one or more connectors comprise at least one bed of nails connector.

In yet another aspect, a heating tape, comprises an insulated heating element including a heating element layer comprising a polymer composite having conductive particles, wherein the heating element layer is disposed between two electrode layers, each extending along at least a substantial portion of the length of the heating tape.

The above summary of the present invention is not intended to describe each illustrated embodiment or every implementation of the present invention. The figures and the detailed description that follows more particularly exemplify these embodiments.

BRIEF DESCRIPTION OF THE DRAWINGS

The invention will be described hereinafter in part by reference to non-limiting examples thereof and with reference to the drawings, in which.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the invention as defined by the appended claims.

DETAILED DESCRIPTION OF EMBODIMENTS

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "forward," "trailing," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

The present invention is directed to a heat tape or heating tape that is flexible and can be used for heating planar, curved or rounded substrates or articles. For example, the heating tape can be used in a wide range of applications including pipe freeze protection, snow melting, transportation and infra-structure anti/de-icing, floor heating, tank heating, traffic sign heating, mirror heating, patient warming, beverage and food container heating, battery heating, car seat heating, and garment heating. The flexible heating tape includes an insulated heating element having a heating element layer that comprises a polymer composite having conductive filler particles and at least one set of conductive electrodes at least partially or fully embedded in the polymer composite and extending along at least a substantial portion of the length of the heating tape. In one aspect, the heating tape of the present application is self-regulating. In another aspect, embodiments of the heating tape of the present invention are constant wattage, which are independent of ambient temperature. The present invention is also directed to a self-regulating heating tape system. To control the in-rush of current at low temperatures, the system includes a ramp controller that continuously monitors and controls the flow of current through the heating tape.

Figure 1A:
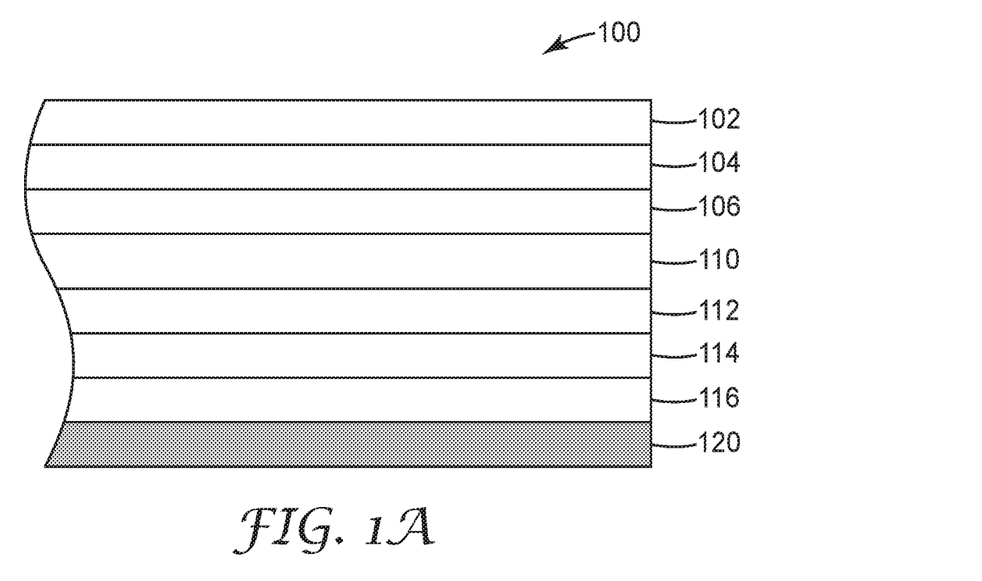
FIG. 1A is a schematic partial cross section view of the layer structure of a heating tape according to a first aspect of the present invention.
Figure 1B:
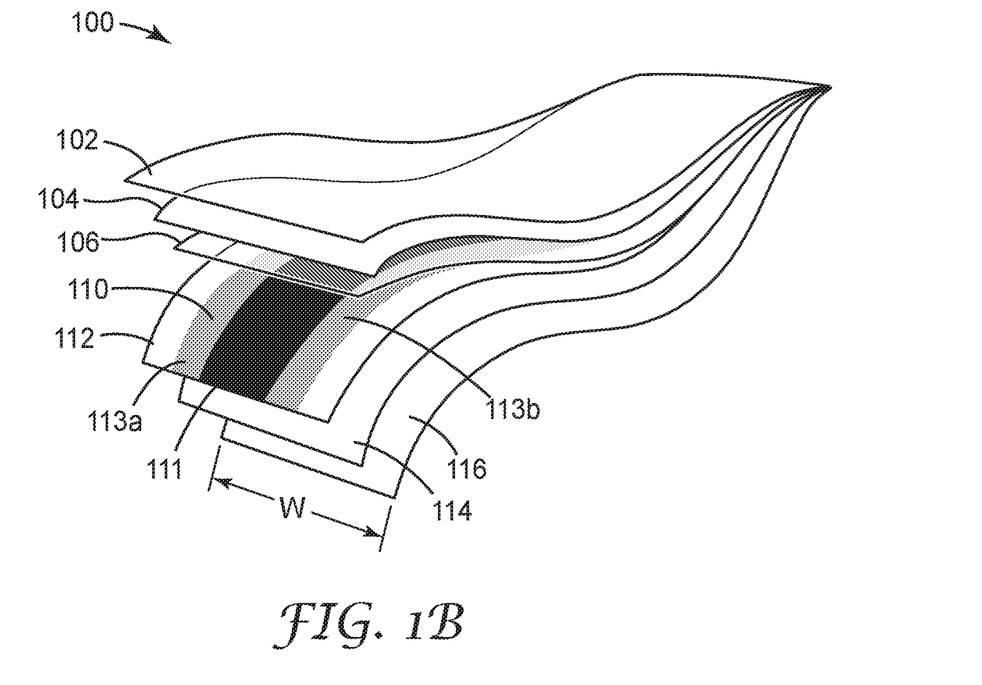
FIG. 1B is a partially exploded perspective view of a heating tape according to a first aspect of the present invention.

FIGS. 1A and 1B show a first aspect of the invention, a heating tape 100 in schematic partial cross section view and partially exploded perspective view, respectively, showing the layer structure of the heating tape. While various embodiments of the invention are referred to as a "heating tape," embodiments of the present invention may be referred to as a "heating cable," as would be understood by one of ordinary skill in the art given the present description.

Heating tape 100 includes a first barrier film 102, which covers a first grounding sheath 104. An insulating layer 106 separates a heating element layer 110 from the first grounding sheath 104. A second insulating film 112 is disposed between the heating element layer 110 and a second grounding sheath 114. A second barrier film 116 covers the other surface of the second grounding sheath 114. Interlayer adhesion can be accomplished via a pressure sensitive adhesive and/or conventional lamination.

Heating tape 100 can optionally further include a separate adhesive layer disposed onto an outer layer of the heating tape. For example, as shown in FIG. 1A, heating tape 100 can further include adhesive layer 120 disposed onto one of the barrier films (such as barrier film 116) to bond the tape to a surface or other substrate. Optionally, the adhesive layer 120 can be provided with a release liner (not shown). The adhesive layer can comprise a conventional adhesive, such as a pressure sensitive adhesive, such as VHB adhesive. Other suitable adhesives include conventional curable and heat bond adhesives.

While each layer of this aspect of the invention is shown as a separate film, other non-film constructions of heating tapes can also be constructed and some are described in detail further below.

In one aspect, the heating tape can be provided in a wide, thin format. For example, the tape thickness can be kept to about 2 mm or less, preferably about 1 mm or less. In addition, the flexibility of the constituent materials allows for a wide format tape, with a width up to and greater than about 100 mm, preferably about 90 mm. The heating tape can be flexible (easily conformable) in both its length and width. For example, this flexibility and large width allows heating tape 100 to be applied about a substantial portion of the circumference of a long pipe or other curved substrate. Of course, the heating tape 100 can also be applied to planar substrates.

In another aspect, the heating tape can be designed to be conformable and retain its conformed state.

Figure 3:
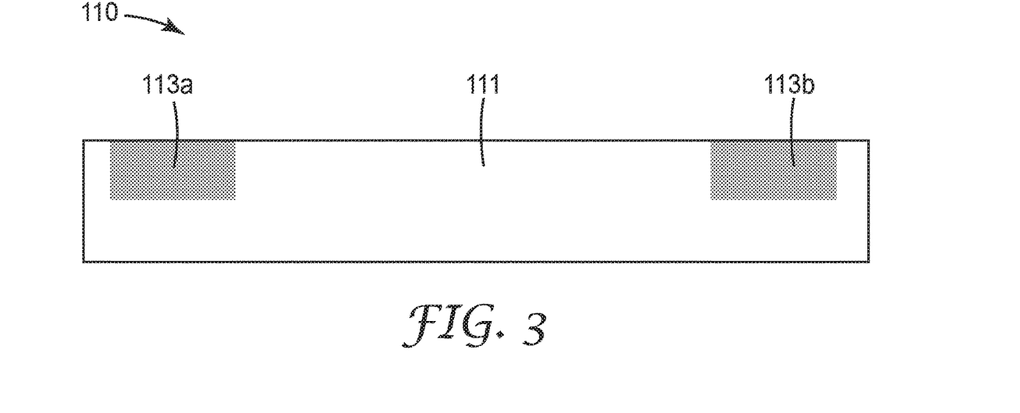
FIG. 3 is a schematic close up view of a heating element layer according to another aspect of the present invention.

In more detail, as shown in FIG. 3, the heating element 110 comprises a heating element film 111 comprising a polymer composite having conductive filler particles. The heating element further includes at least one set of electrodes 113a, 113b at least partially embedded longitudinally in the polymer composite 111. Alternatively, the at least one set of electrodes 113a, 113b can be fully embedded in the polymer composite 111. As is shown in FIG. 1B the heating element film 111 and the at least one set of electrodes 113a, 113b extend along at least a substantial portion of the length of the heating tape. In addition, electrodes 113a, 113b can be co-planar.

In particular, the polymer composite can be blended with conductive fillers including carbon black, carbon fillers, graphite, and metal particles. As mentioned above, the heating tape of this aspect of the present application is self-regulating, where self-regulating is a property of the conductive composite and is a result of the difference of the thermal expansion between the polymer matrix and conductive fillers. Suitable fillers include carbon fibers, carbon nanotubes, graphene, metal nanoparticles and fibers, metal coated particles, and composite particles.

In one aspect, the heating element film 111 comprises a polyolefin blended with carbon black. For example, the polymer composite can comprise a low density polyethylene blended with carbon black. Suitable polymer composites can include semi-crystalline materials that exhibit non-linear thermal expansion, including but not limited to polyethylene, polypropylene, polybutene, poly(dodecamethylene pyromellitimide), ethylene-propylene copolymers and terpolymers with non-conjugated dienes, polyvinylidene fluoride-tetrafluoroethylene copolymers, ethylene-vinyl ester copolymers, waxes and mixture of these materials. For example, see U.S. Pat. No. 3,914,363, incorporated by reference herein in its entirety.

In another aspect, the heating tape can be constant wattage. As such, the polymer composite of heating element film 111 can comprise an amorphous polymer. Exemplary amorphous polymers include polyurethane, polyacrylates, acrylonitrile butadiene styrene, polyethylene phthalate, nylon, polylactic acid, polybenzimidazole, polycarbonate, polyether sulfone, polyetherether ketone, polyetherimide, polyphenylene oxide, polyphenylene sulfide, polystyrene, polyvinyl chloride, polytetrafluoroethylene, or copolymers or blends thereof.

As mentioned previously, the heating element layer 110 also includes at least one set of electrodes 113a, 113b. As shown in FIG. 1B, the heating tape includes a single set of electrodes. In an alternative aspect, additional sets of electrodes can also be provided (such as for wider tape embodiments).

In one aspect, the electrodes 113a, 113b can be formed from a conventional metal, such as copper or aluminum. In other aspects, the electrode material can comprise a conductive sheet, foil, or coating. In another aspect, the electrode material can comprise an expanded mesh. The material of the electrode layer can include any suitable conductive material such as, for example, metals, semiconductors, doped semiconductors, semi-metals, metal oxides, organic conductors and conductive polymers, and the like, and mixtures thereof. Suitable inorganic materials include, for example, copper, gold, and other metals or metal alloys commonly used in electronic devices, as well as transparent conductive materials such as transparent conductive oxides (for example, indium tin oxide (ITO), antimony tin oxide (ATO), and like). Suitable organic materials include, for example, conductive organic metallic compounds as well as conductive polymers such as polypyrrole, polyaniline, polyacetylene, polythiophene, and materials such as those disclosed in European Patent Publication EP 1172831, incorporated by reference herein in its entirety.

The heating element film 111 (see e.g., FIG. 3) can be formed using a standard manufacturing process, such as extrusion. For example, the compounding can be carried out in a twin screw extruder and the film can be made by coating a PET backing with the compounded resin using a slot die on the extruder. By utilizing this process, the electrodes can be either partially or fully embedded in the composite material.

In one aspect, the electrodes are aligned on one surface of the PET backing in the direction facing the die with a defined distance between the electrodes before the die coating. The conductive composite can then be die-coated onto the backing with the electrodes. The side of electrode that is in intimate contact with the backing may not be coated while other surfaces will be to achieve the partial embedding.

As mentioned above, a problem with conventional heating tapes relates to electrical contact resistance—due to relatively low conductive fill concentration at the interface and a limited electrode/polymer contact, the electrical contact resistance is very high. To combat this problem, in one aspect of the present invention, a buff coating process can be utilized to produce metal substrates (e.g., electrodes) having graphene-like coating on at least one major surface, thereby achieving low contact resistance. The graphene-like coating comprises graphite nano-platelets in amorphous carbon or nanocrystalline graphite. A suitable buff coating process is described in U.S. Pat. No. 6,511,701, which is incorporated by reference herein in its entirety. This exemplary process can be a low cost and highly effective way to make nanometer thick semi-conductive graphite based coatings on a wide range of substrates. Some of the examples below show the improved level of contact resistance between coated and uncoated electrode substrates.

In addition, the heating element can further comprise an adhesion promoter that enhances the adhesion between the electrodes and the composite material. Polyolefins are common low surface energy materials, and as such they exhibit low bonding strength to polar substrates like metal surfaces. Materials that contain polar functionalities (amino, hydroxyl, carboxylic acid, anhydride, esters, amides, etc.) and can be uniformly compounded with the polymer matrix can be used as adhesion promoter to increase its surface energy and bonding strength to electrode surface. Suitable adhesion promoters include, but are not limited to, DuPont™ Fusabond® grafted polyolefins DuPont™ Elvax® copolymers, and the like.

As shown in FIGS. 1A and 1B, in this aspect of the present invention, first and second insulating films 106, 112 electrically insulate the heating element 110 from the first and second grounding sheaths 104, 114. The insulating films can comprise a conventional insulating material, such as a thermoplastic polyurethane film, or other conventional insulating materials such as silicon, polyester, rubbers, PVC, PTFE (fluoropolymers), and the like. In one aspect, the insulating films can be applied to the heating element via a conventional lamination process. In another aspect, the insulating films can be transparent, which can allow an installer to visually identify suitable connection locations in a straightforward manner.

Figure 2A:
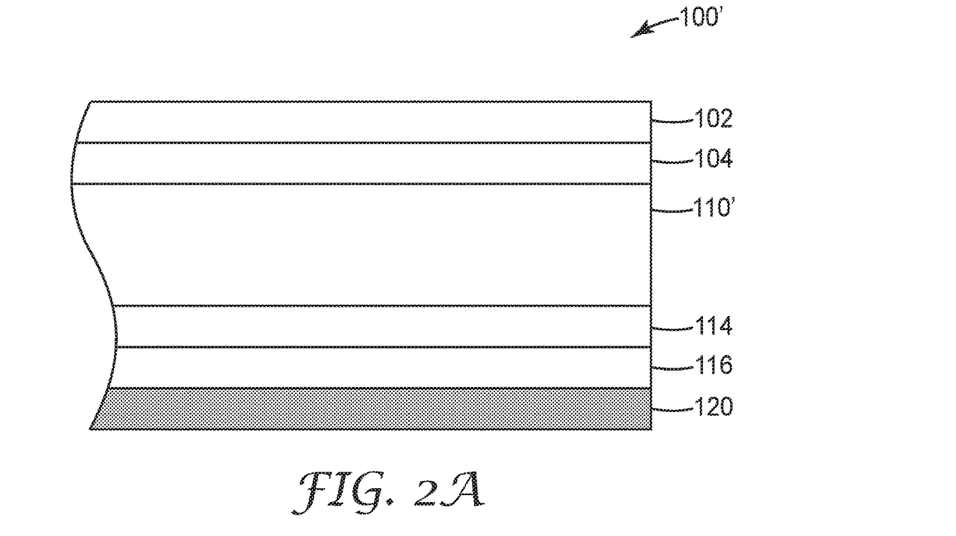
FIG. 2A is a schematic partial cross section view of the layer structure of a heating tape according to another aspect of the present invention.

Alternatively, the heating tape can comprise a cured liquid resin insulation surrounding the heating element. For example, as shown in FIG. 2A, heating tape 100' includes a first barrier film 102, which covers a first grounding sheath 104. In this aspect, a heating element layer 110' comprises a heating element having a heating element film, such as described above, that is encapsulated by a cured liquid resin. The cured liquid resin insulates the heating element film from first grounding sheath 104 and second grounding sheath 114. A second barrier film 116 covers the other surface of the second grounding sheath 114. Heating tape 100' can further include an adhesive layer 120 disposed onto one of the barrier films (such as barrier film 116) to bond the tape to a surface or other substrate.

In one aspect, the encapsulated heating element can be formed by injecting a liquid resin between the grounding layer and the heating element, then curing the liquid resin. The cured resin insulates the heating element from the grounding layer/films and bonds them together. Example resins suitable for heating tape 100' include epoxy, silicon, polyurethane, polyacrylate, polythiol-ether, polyester, and the like.

Figure 2B:
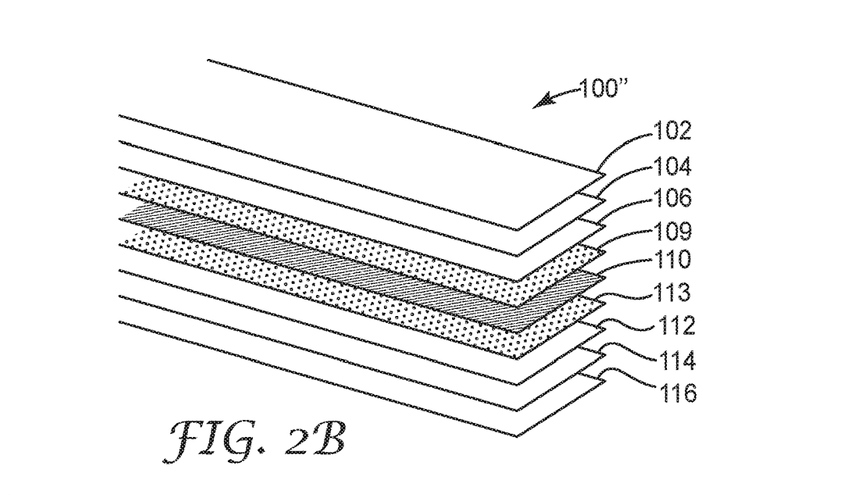
FIG. 2B is an exploded perspective view of a heating tape according to another aspect of the present invention.

In another alternative aspect, a heating tape can have an electrode structure where the electrodes are disposed in different planes from the heating element and/or from each other. For example, FIG. 2B shows a heating tape 100" that includes a first barrier film 102, which covers a first grounding sheath 104. In this aspect, the heating element 110 is disposed between electrode layers 109 and 113. An insulating layer 106 is disposed between the first electrode layer 109 and the grounding sheath 104. A second insulating film 112 is disposed between the second electrode layer 113 and a second grounding sheath 114. A second barrier film 116 covers the other surface of the second grounding sheath 114. Interlayer adhesion can be accomplished via a pressure sensitive adhesive and/or conventional lamination. Similar to alternative embodiments described herein, the grounding sheaths 104, 114 are optional.

In addition, heating tape 100" can optionally further include a separate adhesive layer (similar to layer 120 shown in FIG. 1A) disposed on an outer layer, such as disposed onto one of the barrier films (such as barrier film 116) to bond the tape to a surface or other substrate. Optionally, the adhesive layer can be provided with a release liner (not shown). The adhesive layer can comprise a conventional adhesive, such as those described above.

In one aspect, the heating tape 100" can be provided in a wide, thin format, such as that described above. In another aspect, the heating tape can be designed to be conformable and retain its conformed state.

In more detail, the heating element 110 can comprise a heating element film, having a composition similar to film 111 described above.

In one aspect, the electrodes 109, 113 can be formed from a conventional metal, such as copper or aluminum. In other aspects, the electrode material can comprise a conductive sheet, foil, or coating. In another aspect, the electrode material can comprise an expanded mesh. The material of the electrode layers, as well as the insulating films, can be similar to that described above.

This alternative construction can provide for a more simplified lamination, thinner foils, streamlined production (in 24" or 36" wide rolls), and lower carbon black density in the heating element film.

Optionally, heating tapes 100, 100', 100" can each comprise grounding sheaths 104, 114. This ground plane can be disposed on one or both sides of the insulating films or resin and can prevent current runaway and human electrocution in case of damage on the insulating layer by sharp objects. In one aspect, the first and second grounding sheaths 104, 114 can comprise a flexible metal material. The grounding sheath material can be a material with good electrical conductivity, including but not limited to metal foils, metal meshes, flat metal braids, conductive composite films, and conductive fabrics (both woven and nonwoven). For example, the grounding sheath metal material can comprise a metal foil or a metal screen. The material of the grounding sheath can also include any suitable conductive material such as, for example, metals, semiconductors, doped semiconductors, semi-metals, metal oxides, organic conductors and conductive polymers, and the like, and mixtures thereof. Suitable inorganic materials include, for example, copper, gold, and other metals or metal alloys commonly used in electronic devices, as well as transparent conductive materials such as transparent conductive oxides (for example, indium tin oxide (ITO), antimony tin oxide (ATO), and like). Suitable organic materials include, for example, conductive organic metallic compounds as well as conductive polymers such as polypyrrole, polyaniline, polyacetylene, polythiophene, and materials such as those disclosed in European Patent Publication EP 1172831.

The heating tapes 100, 100', 100" can further comprise first and second barrier films 102, 116. The barrier films form an outer protection layer for the tape. In one aspect the first and second barrier films each comprise a moisture resistant, flame retardant material that can be laminated to the grounding layer. A suitable barrier film material can include a thermoplastic polyurethane film, or other conventional materials such as silicon, polyester, rubbers, PVC, PTFE (fluoropolymers), and the like. In one aspect, the barrier film materials comprise materials that allow the tape to meet one or both of CSA 130-3 and IEEE 515.

Alternatively, a barrier layer can be applied to the insulated heating element/grounding layer structure after the grounding sheath is bonded to the heating element. For example, a liquid resin (with or without solvent) can be applied to the grounding sheaths. Suitable resins include epoxy, silicon, polyurethane, polyacrylate, polythiol-ether, polyester, and the like.

In one aspect, the heating film can be supplied in a large roll format. As such, individual tapes may need to be cut in different lengths to fit application requirements. In addition, connecting the heating element to either a power source or another heating film may be necessary during installation. For the connection, the heating element and the grounding layer will need to be separated and connected to different sources, with the heating element conductors connecting to a power source and the grounding sheath to ground. Therefore, in another aspect of the invention, a heating tape can be provided with straightforward separation between the grounding sheath and the heating element layer at certain lengths along the tape.

In one aspect, to achieve an easy separation between the grounding layer and the heating element layer, the bonding strength between them can be made lower than other interlayer adhesions. In this aspect, the heating tape can include a weak adhesive disposed between the first insulating film and the first grounding sheath at a separation point in the tape. The separation point (e.g., a perforation across the width of the tape) can be provided at a regular interval of tape length (e.g., every 5 meters, every 10 meters, etc.) or it can be provided intermittently at different tape lengths.

Figure 5:
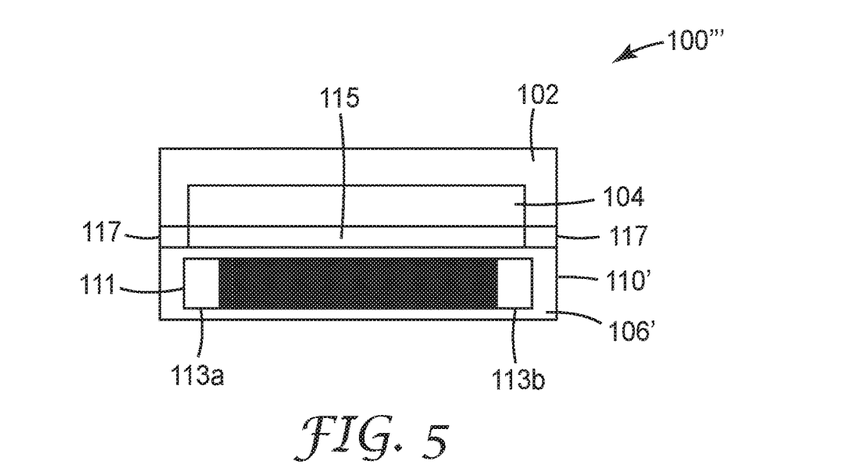
FIG. 5 is a schematic partial view of the layer structure of a heating tape according to another aspect of the present invention.

For example, FIG. 5 shows another aspect of the invention, a schematic cross section partial view of heating tape 100''' at a designated separation point. The heating element 110' can be formed in a manner similar to that described above, with a cured resin 106' insulating the heating film 111/electrode set 113a, 113b from the grounding sheath 104. A barrier layer 102 can also be provided, either in film form or a cured resin/coating. In addition, heating tape 100''' further includes a weak adhesive layer 115 disposed between heating element 110' and the grounding sheath 104 to allow for preferential delamination between the grounding sheath and the electrode leads of the heating element 110' during splicing or electrical connection. In addition, a stronger adhesive 117 can also be disposed along the edges of the tape construction to hold the overall tape together during splicing/connection. In a further alternative aspect, the weak adhesive layer 115 can be omitted altogether, with the strong adhesive 117 preventing complete delamination of the heating element and grounding sheath from the tape edges.

Figure 4:
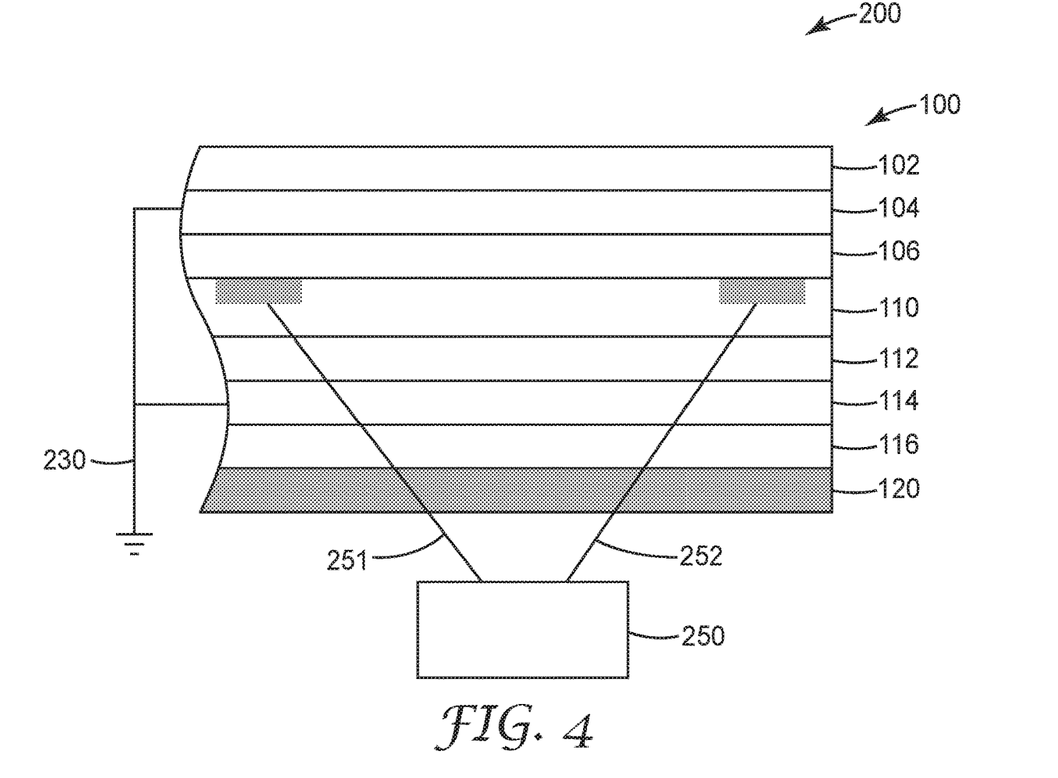
FIG. 4 is a schematic partial view of a heating tape system according to another aspect of the present invention.

As mentioned above, in another aspect, the present invention is related to a self-regulating heating tape system. FIG. 4 shows a schematic view of a self regulating heating tape system 200. The system 200 includes a heating tape, such as heating tape 100 described above. Alternatively, heating tapes 100', 100", 100'" can be utilized in system 200. To control the in-rush of current at low temperatures, system 200 includes a ramp controller 250 that continuously monitors and controls the flow of current through the heating tape. The ramp controller can be connected to electrodes 113a, 113b via wires 251, 252. The first and second grounding sheaths 104, 114 can be connected to ground via grounding wire(s) 230.

Although the ramp controller 250 is described as being part of a self-regulating heating tape system 200 with any of the heating tapes 100, 100' and 100" described herein, as would be apparent to one of ordinary skill in the art given the present description, ramp controller 250 can be utilized with other constructions of heating tapes and cables as well.

Figure 6:
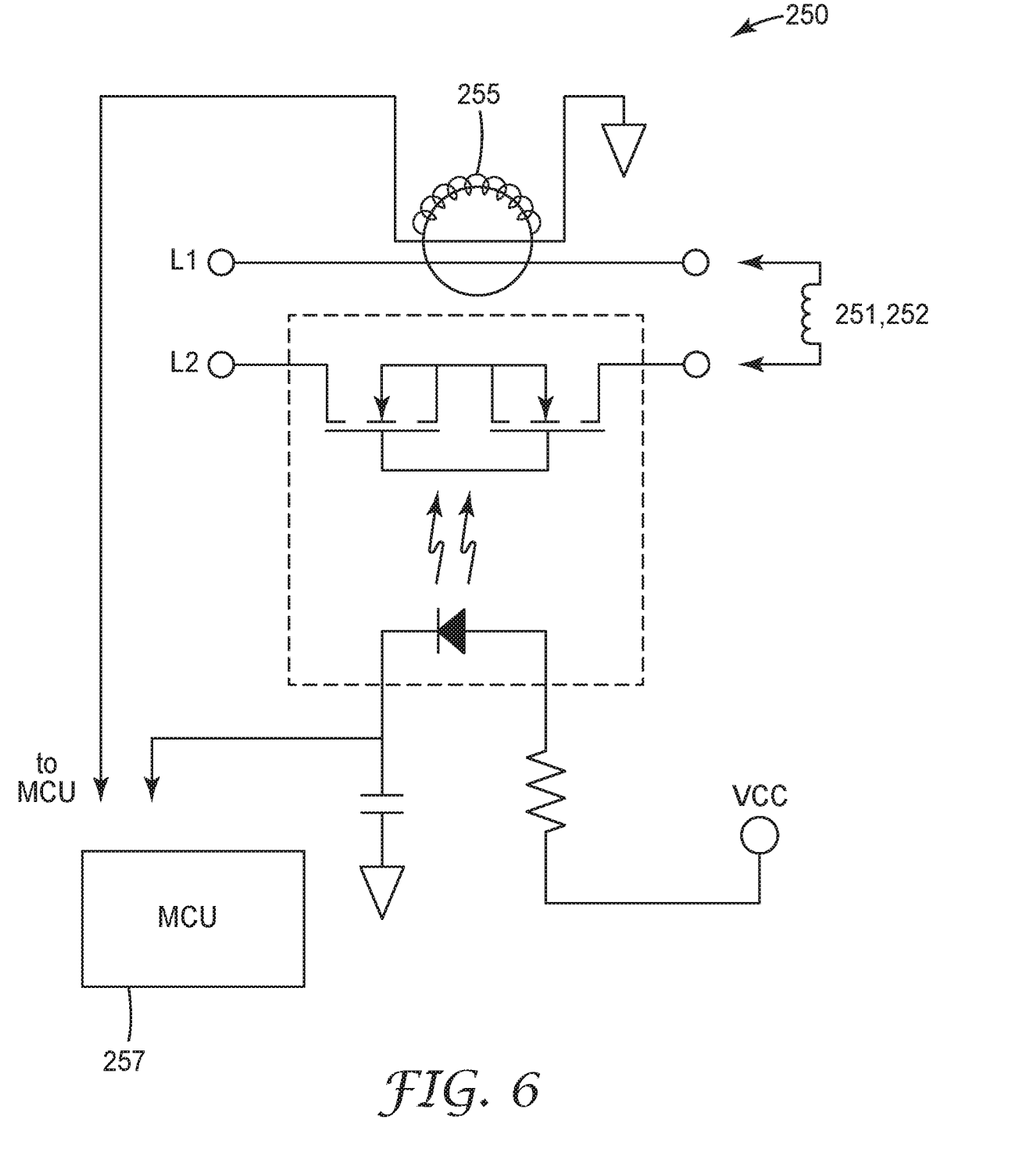
FIG. 6 is a schematic view of a self regulating circuit of a power ramp controller according to another aspect of the invention.

In one example circuit configuration, as shown in FIGS. 4 and 6, ramp controller 250 includes a solid state relay, such as a dual MOSFET, to control the flow of AC current on L2. L1 can pass through a toroid 255 complete with a pickup wire to measure the amount of current flowing through L1. Because the circuit completes via the heating wires 251, 252, current in L1 is the same as current in L2. A microcontroller unit 257 can continuously monitor the current flowing through wire L1 and modify the pulse width modulation (PWM) to control the voltage to the MOSFET gates, putting the MOSFET in linear mode, which adds resistance to L1 and keeps current down. When the heating tape (or cable) is up to temperature, the microcontroller unit will automatically saturate the MOSFET's gates in order to provide the lowest resistance to the current path as is possible.

Unlike conventional devices that rely on a negative temperature coefficient device (NTC) to control in-rush current, the power ramp controller of this aspect of the invention is designed to continuously monitor the current flowing through the heating tape/cable and continuously adjust its resistance in order to avoid exceeding the maximum specified limit. NTCs operate based on heat. As current flows through them, they initially offer a high resistance (which creates more heat) and progressively lower their resistance. Once the NTC is "hot" it no longer offers significant resistance to the current path, whether or not the current requirement of the device is beyond an imposed limit.

Because self-regulating heating tape/cables continuously change their power output to satisfy changing ambient conditions, the ramp controller of this aspect of the invention continuously monitors and responds to prevent exceeding a specified current limit.

In an alternative aspect, the ramp controller can include an analog circuit having TRIACs to act as high impedance devices until they receive the gate triggering voltage. Other circuit designs may also be utilized, as would be apparent to one of ordinary skill in the art given the present description.

The self-regulating heating tape system 200 can further include one or more connectors having multiple contact points to contact the set of electrodes of the heating element layer. For example, the connectors utilized can be configured as bed-of-nails type connectors. The overall system configuration, which can include the heating tape and accessories (connectors, applicators and power controllers) can facilitate quick installation and electrical connection.

Figure 7:
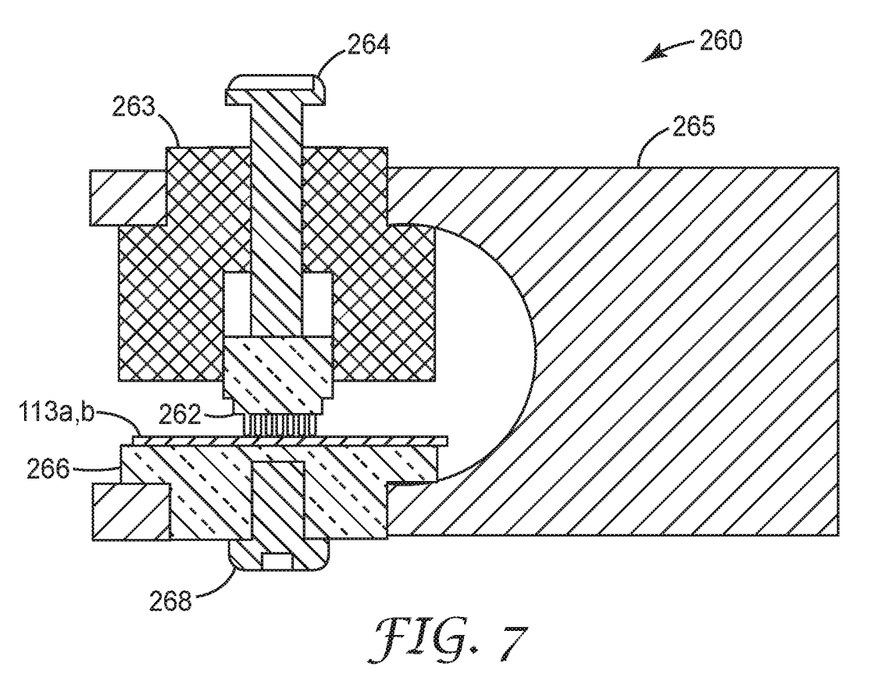
FIG. 7 is a schematic side view of an exemplary compression connector according to yet another aspect of the invention.

For example, FIG. 7 shows an exemplary connector, here shown as a compression connector 260. The connector 260 includes a connector body 265 that supports a bed of nails type connector 262 that can be pressed into an electrode layer 113 a,b of an inserted heating tape via a compression screw 264. The bed of nails connector can comprise a set of steel or other metallic pins that can penetrate the electrode layer (usually a foil) and secure it in place after tightening. The electrode layer 113a,b is pressed between the bed of nails connector 262 and a contact plate 266. The contact plate can be formed from a metallic or other conductive material (e.g., copper, brass, etc.) and can support a connection point or screw 268, for connecting the connector 260 to a power source.

Overall, due to the reduced thickness, as compared to a conventional industrial heating cable (about ¼" or greater) the heating tape 100, 100', 100" is more flexible, which makes it more conformable to the surfaces to be heated. The tape construction with an outer adhesive layer simplifies and accelerates product installation. The heating tape can be applied to a flat or curved surface using a hand held tool. Further, the wide profile of the heating tape makes the heat injection more efficient than the heating cables, eliminating the need for the use of foil tape to spread the heat over a large surface area.

Experiments

Several experiments were performed.

In a first experiment, aluminum foils (12.5 micron thick) with and without buff-coated graphite layer were tested for electrical contact resistance. For the graphite coated foil sample, the coating on the rough side of the foil was tested. A 4.7 mil thick carbon black polymer composite (CBPC) film was made by compounding and extruding 99 wt. % RTP ESD C700A resin and 1 wt. % Dupont Fusabond M603 using a co-rotating twin screw extruder Omega 40 Steeramerica Inc, Uniontown Ohio. For making a test sample, a CBPC film was laid flat on the rough side of an aluminum foil and the two layers were placed and pressed between two paper release liners using a Carver press. The temperature of the Carver press was set at 200° C. and a pressure of 8 metric tons was applied on the sample. The press pressure was allowed to decrease slowly to around 3 metric tons before the pressure was manually released. After cooling, 3 disk specimens of each sample with about 15 mm were cut out using a circular cutter and each disk was put between two gold coated circular electrodes (10 mm in diameter) in a through-resistance tester that were connected to a multimeter for resistance measurement. For the through-resistance measurement, a pressure of 20 psi was applied onto the sample and the resistance was recorded after it stabilized. After the resistance measurement, the foil backing was removed manually and the CBPC film was measured for through-resistance again and film thickness. The contact resistance between the foil and the CBPC film was then determined by subtracting the through-resistance of the CBPC film from that of the foil/CBPC film construction. Attempts to reduce the contact pressure below 20 psi to better mimic real applications were not successful using the through-resistance tester due to the limitation of the instrument.

TABLE 1

| Sample | | 1 | 2 | 3 | Average | Deviation |
|---|---|---|---|---|---|---|
| Buff coated foil | CBPC film thickness/mil | 4.4 | 5.3 | 4.51 | | |
| | Through-resistance with foil/Ohm | 6.7 | 5.7 | 6.3 | | |
| | Through-resistance without foil/Ohm | 1.5 | 1.35 | 1.74 | | |
| | Contact resistance/Ohm | 5.2 | 4.35 | 4.56 | 4.70 | 0.44 |
| Uncoated foil | CBPC film thickness/mil | 4.65 | 4.85 | 4.74 | | |
| | Through-resistance with foil/Ohm | 32.1 | 44.5 | 49.2 | | |
| | Through-resistance without foil/Ohm | 1.15 | 1.96 | 1.3 | | |
| | Contact resistance/Ohm | 30.95 | 42.54 | 47.9 | 40.46 | 8.66 |

The results of these tests are shown in Table 1. The buff coated foil exhibited close to 10 times lower contact resistance with the CBPC film than the uncoated foil samples under the contact pressure of 20 psi., As such, the buff-coated graphite layer can provide an effective interface material to facilitate the electron transfer between the aluminum foil and CBPC film.

In another test, the adhesion between aluminum foil and the CBPC film was measured using a T-peel test method on an IMASS SP-2100 slip/peel tester (Instrumentors, Strongville, Ohio) with a 12"/min pulling rate. The results of this test show that with graphite coating, the adhesion increased by 144%.

In another test, an example heating element was constructed as follows. A heating element film (similar to film 111 shown in FIG. 1B) was constructed, having a width of 3.25" wide, with two 0.75" wide, 5 mil thick conductors longitudinally embedded on one side of film. The conductors/electrodes can be buff-coated, as described above. In this experiment, the heating element is made of low density polyethylene blended with carbon black and poly(maleic anhydride-co-ethylene). The compounding is carried out in a twin screw extruder and the film is made by coating a PET backing with the compounded resin using a slot die on the extruder. Two aluminum foil strips as conductors are in an intimate contact with the PET backing before coming into the die. After coating, the conductors are partially embedded by the resin. The thickness of the heating film is between about 6 and 7 mils. After removing the PET backing, the extruded film can be electron beam irradiated to have long term stability.

In Table 2, the heating tape is compared against a commercially available heating cable (Pentair XL-8-1).

TABLE 2

| | Example heating element | Commercial heating cable |
|---|---|---|
| Width | 88 mm | 12 mm |
| Thickness | 1.0 mm | 5.5 mm |
| Current carrying capacity | 40 Amp | 40 Amp |
| Wattage (120 V) | 5-10 W/ft | 5-10 W/ft |

The results show a heating tape of much reduced thickness and much greater width, that has the electrical current capacity and wattage of a commercial heating cable.

In another experiment, the flexibility of the heating tape is compared against a commercially available heating cable (Pentair XL-8-1). In this experiment, two heating tape constructions were used. A first heating tape sample (Heating Tape 1) included a heating element layer (constructed in a manner similar to that described above) having a heating film with a thickness of about 6 mil and two partially embedded electrodes having a width of about ¾" and a thickness of about 5 mil, and an insulation layer comprising polyurethane film having a thickness of about 4 mil, a copper foil grounding sheath having a thickness of about 15 microns, and a barrier layer comprising a flame retardant polyurethane coating having a thickness of about 7.5 mil. An adhesive (3M 467 MP, available from 3M Company) is used to bond the grounding sheath to the insulation layer and for lamination of the heating element layer to the insulation layer. An outer adhesive layer (for bonding to the structure being heated by the tape) is formed from 3M 467 MP adhesive with a paper backing.

A second heating tape sample (Heating Tape 2) included a heating element layer (constructed in a manner similar to that described above) having a heating film with a thickness of about 6 mil and two partially embedded electrode having a width of about ¾" and a thickness of about 5 mil, and insulation layer comprising polyurethane film having a thickness of about 4 mil, a copper mesh grounding sheath having a thickness of about 5 mil (mesh size 150), and a barrier layer comprising a flame retardant polyurethane coating having a thickness of about 7.5 mil. An adhesive (3M 467 MP, available from 3M Company) is used to bond the grounding sheath to the insulation layer and for lamination of the heating element layer to the insulation layer. An outer adhesive layer (for bonding to the structure being heated by the tape) is formed from 3M 467 MP adhesive with a paper backing.

To determine bending flexibility, samples were tested (3 point flexibility @2"/min (Instron)) at their full cross-sectional dimension. A test span of 7 cm was selected to simulate the typical diameter of a cylinder or pipe that would be wrapped. A 14 mm deflection, which corresponds to 20% of the span was selected to provide a substantial arc in the samples. On average (3 tests), the Pentair heating cable required a force of about 50.9 N to complete the 14 mm deflection. On average (3 tests), Heating Tape 1 required a force of about 5.1 N to complete the 14 mm deflection. On average (3 tests), the Heating Tape 2 required a force of about 6.9 N to complete the 14 mm deflection. Thus, the heating tape construction described herein can provide nearly an order of magnitude improved flexibility over a conventional heating cable.

The present invention has now been described with reference to several individual embodiments. The foregoing detailed description has been given for clarity of understanding only. No unnecessary limitations are to be understood or taken from it. It will be apparent to those persons skilled in the art that many changes can be made in the embodiments described without departing from the scope of the invention. Thus, the scope of the present invention should not be limited to the details and structures described herein, but rather by the structures described by the language of the claims, and the equivalents of those structures.

The invention claimed is:

1. A heating tape, comprising:
an insulated heating element including a heating element layer comprising a polymer composite having conductive particles and at least one set of conductive electrodes at least partially embedded in the polymer composite and extending along at least a substantial portion of the length of the heating tape, wherein the at least one set of electrodes comprise a graphene-like coating on at least one major surface that interfaces with the heating element layer.

2. The heating tape of claim 1 further comprising:
first and second grounding sheaths, wherein the insulated heating element is disposed between the first and second grounding sheaths.

3. The heating tape of claim 2 further comprising:
first and second barrier layers to protect the heating tape from moisture ingress.

4. The heating tape of claim 1, wherein the insulated heating element comprises first and second insulating layers disposed on either side of the heating element layer.

5. The heating tape of claim 1, wherein the insulated heating element comprises cured liquid resin covering the sides of the heating element layer.

6. The heating tape of claim 1, further comprising an adhesive layer disposed on an outer layer of the heating tape.

7. The heating tape of claim 6, wherein the adhesive comprises a pressure sensitive adhesive.

8. The heating tape of claim 1, wherein the polymer composite having conductive particles comprises a carbon black polymer composite.

9. The heating tape of claim 8, wherein the carbon black polymer composite comprises a polyolefin blended with carbon black.

10. The heating tape of claim 1, wherein the polymer composite comprises an amorphous polymer.

11. A heating tape, comprising:
a first barrier film;
a first grounding sheath;
a first insulating film;
a heating element layer;
a second insulating film;
a second grounding sheath;
and a second barrier film,
wherein the heating element layer is disposed between the first and second insulating films and includes a heating element film comprising a polymer composite having conductive particles and at least one set of electrodes at least partially embedded in the polymer composite and extending along at least a substantial portion of the length of the heating tape, wherein the at least one set of electrodes comprise a graphene-like coating on at least one major surface that interfaces with the heating element layer.

12. The heating tape of claim 11, further comprising a pressure sensitive adhesive layer disposed on one of the first and second barrier films.

13. The heating tape of claim 11, wherein the polymer composite having conductive particles comprises a carbon black polymer composite.

14. The heating tape of claim 11, wherein the heating film comprises an extruded material.

15. The heating tape of claim 11, wherein the first and second grounding sheaths each comprise a flexible metal material.

16. The heating tape of claim 11, wherein the first and second barrier films each comprise a moisture resistant, flame retardant material.

17. The heating tape of claim 12, wherein the tape extends along a length of and is adhered around a substantial portion of the circumference of a pipe.

18. A self regulating heating tape system for a pipe or other surface, comprising:
the heating tape of claim 1: and
a power ramp controller having a component to regulate an in-rush of current to the heating element and monitor current flowing through the heating tape and adjust current applied to the heating tape.

* * * * *